Figure 1:
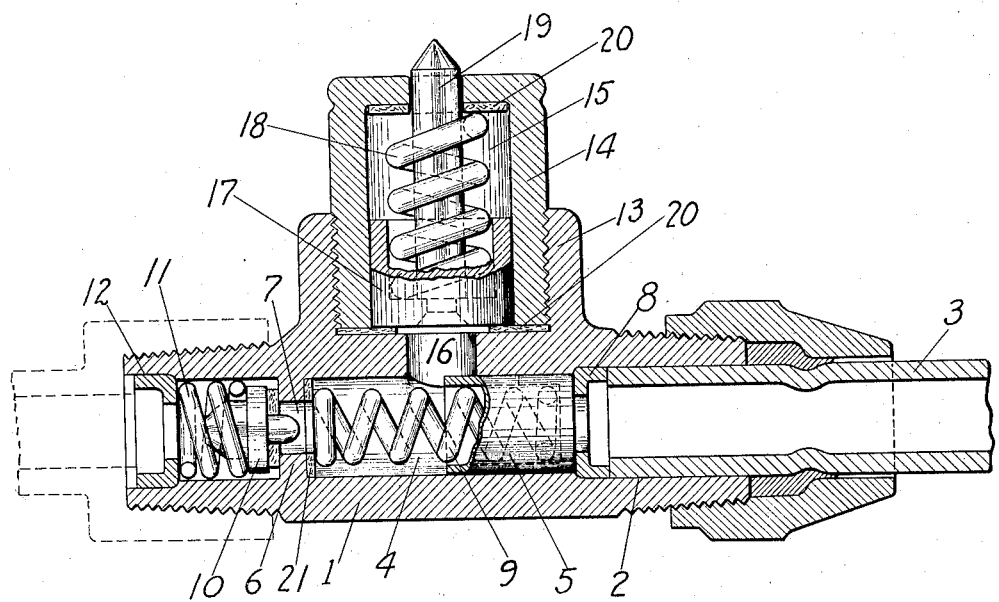

Jan. 2, 1934.    T. W. HALLERBERG    1,942,096
CONTROL FOR PRESSURE FEED LUBRICATING SYSTEMS
Filed May 26, 1931    2 Sheets-Sheet 1

Inventor
Theodore W. Hallerberg.
By Owen & Owen,
Attorneys.

Jan. 2, 1934.  T. W. HALLERBERG  1,942,096
CONTROL FOR PRESSURE FEED LUBRICATING SYSTEMS
Filed May 26, 1931  2 Sheets-Sheet 2
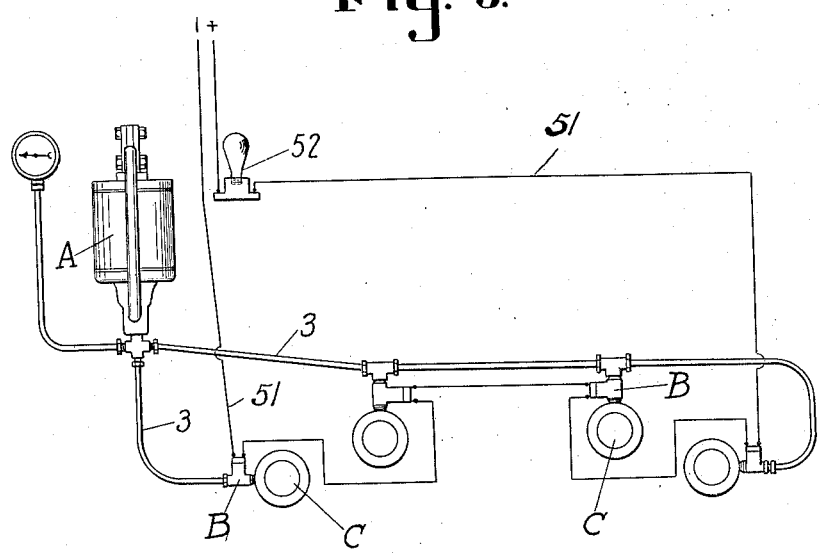
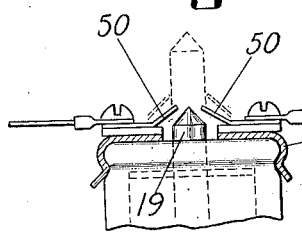
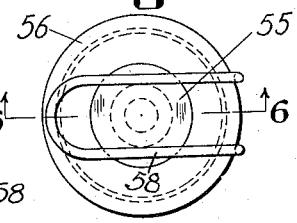
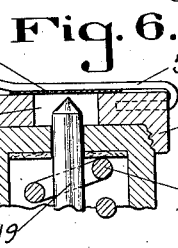
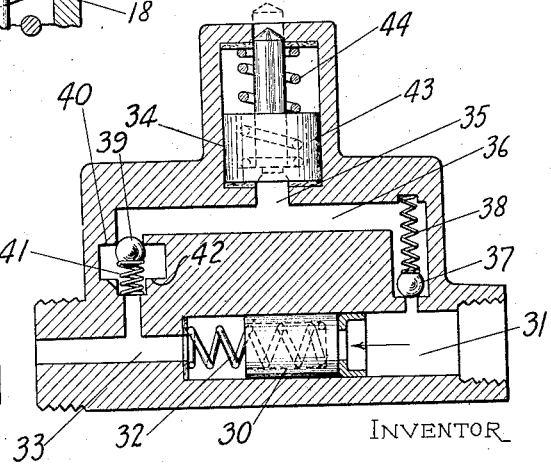

Patented Jan. 2, 1934

1,942,096

UNITED STATES PATENT OFFICE 1,942,096

CONTROL FOR PRESSURE FEED LUBRICATING SYSTEMS

Theodore W. Hallerberg, Hawthorne, Calif., assignor, by mesne assignments, to The Commerce Guardian Bank, Toledo, Ohio, as trustee Application May 26, 1931. Serial No. 540,189

24 Claims. (Cl. 184—7)

This invention relates to pressure feed centralized lubricating systems, and particularly to control means therefor of the automatically operable type.

In the use of systems of this character, lubricant is forced under pressure, usually by manually operated means, through the lubricant supply and distributing means to separate measuring valves and thence into the bearings or parts to be lubricated. The primary object of the invention is the provision in lubricant distributing systems of the character described, of simple and efficient means which is operable under a lubricant supply pressure in the supply line, first to utilize such pressure to inject a first predetermined quantity of fluid into the bearing parts at a high pressure, then to direct a second predetermined quantity of fluid under a lower pressure to the bearing parts, the high pressure charge operating not only to furnish an initial supply of lubricant to the bearing but to clean the passage to the bearing should it by any chance become clogged, and the secondary or low pressure charge then operating to furnish a continuing supply of a measured quantity of lubricant to the bearing parts at a pressure suitable merely to supply the lubricant as the lubricant in the bearing becomes used in operation.

A further object of the invention is the provision, in a lubricant pressure supply line having a secondary lubricant supply chamber in connection therewith, of means which is operable by pressure from the lubricant supply source to inject an initial high pressure charge of lubricating fluid to a bearing part, then to direct the next charge plus a further second predetermined amount of fluid into the secondary supply chamber, after which said means returns to a position closing the communication between said chamber and the supply line and placing said chamber in communication with the bearing part, the secondary chamber having means associated therewith for forcing lubricant from such chamber at a lower pressure than the initial charge to the bearing part when the line between the chamber and bearing part is open.

A further object of the invention is the provision of simple, efficient and inexpensive means in association with a secondary supply chamber for indicating the functioning of the valve, whereby the operator may check each valve individually or together to determine if the lubricant supply and control means is properly functioning as to all bearings with which it is associated.

Further objects and advantages of the invention will be apparent from the following detailed description, and from the embodiments thereof illustrated in the accompanying drawings, in which—

Figure 2:
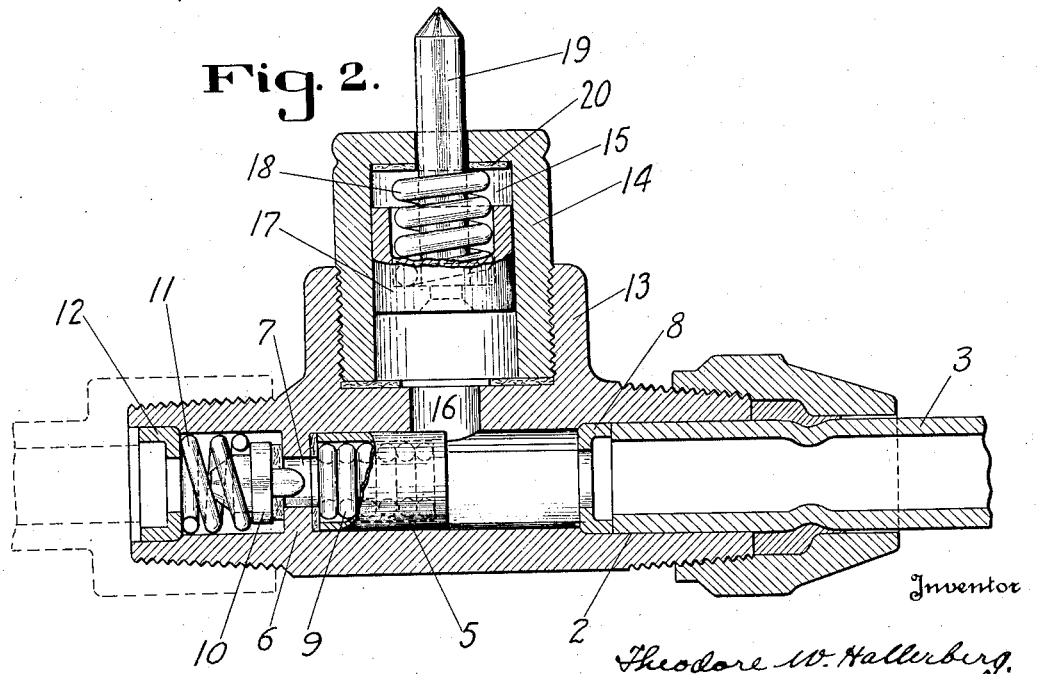

Figure 1 is a central longitudinal section of the preferred form of control unit embodying the invention, with the control valve in normal position, and with the secondary chamber empty. Fig. 2 is a similar view showing the positions of the parts of the control valve when lubricant is being fed into the secondary chamber from the supply line. Fig. 3 is a diagrammatic illustration of a pressure feed system embodying the invention with an electric signal means associated with the separate control units to indicate if each of such units is properly functioning. Fig. 4 is a fragmentary view of a control unit equipped with a signal circuit switch with the movable member of the switch in open position. Fig. 5 is a top plan view of a secondary chamber of a unit equipped with a different means for indicating proper functioning of the unit. Fig. 6 is a fragmentary section on the line 6—6 in Fig. 5. Fig. 7 is a view similar to Fig. 1 of a modified form of control unit, and Fig. 8 is a sectional detail of another modified form of control unit.

Referring to the drawings, 1 designates the body or casing member of one form of control unit embodying the invention, which body is provided lengthwise therethrough, in the present instance, with a passage 2 adapted to have one end in communication with a source of lubricant supply under pressure, as through a tube 3, and its other end in communication with a bearing of the system in which disposed. The passage 2 is provided intermediate its ends with a valve chamber 4, designated the primary lubricant supply chamber, in which a piston type of valve 5, designated as the primary piston, is mounted for reciprocatory movements. One end of the chamber 4 is formed by an annular internal flange 6 having a discharge opening 7 therethrough, and the other end is formed by a cupped member 8 inserted in the inlet end of the passage 2 against a shoulder therein and forming a restricted inlet passage for lubricant to the inlet end of the valve chamber 4, and also serving as a stop for limiting the rearward movements of the valve 5. A spring 9 acts against the piston 5 to normally retain it at the rear end of its stroke in the chamber 4, and has one end seating against the flange 6 and its other end entering and bearing against the adjacent side of the valve. The outlet passage 7 from the valve chamber 4 is normally closed by a check-valve 10, which is held yieldingly seated against the outer side of the flange 6 by a spring 11, the outer end of which bears against a cup washer or stop member 12 inserted within the outlet end of the passage 2.

The body 1 at one side of the primary valve chamber 4 is provided with a cylindrical extension 13 into which a cylinder 14 is adapted to be threaded. This forms a secondary lubricant supply chamber 15 which is in communication at its inner end with the primary chamber 4, substantially midway of the ends of the latter through a port 16. A piston 17, designated as the secondary piston, is mounted in the cylinder 14 and is normally held at the inner end of its stroke, or adjacent to the port 16 by a spring 18, which is disposed between the piston and the outer end of the chamber 15. A stem 19 projects from the piston 17 through the outer end of the cylinder 14 and serves as a visible means for indicating the position of the cylinder, as the extent of projection of the stem 19 from the cylinder end indicates the position of the piston 17 in the cylinder.

It is preferable to provide washers 20 within the ends of the chamber 15 to seal the secondary piston 17 when at either end of its stroke, and it is also preferable to provide a similar washer 21 at the forward end of the valve chamber 4 to seal the primary piston 5 at the forward end of its stroke.

It is apparent that the primary valve 5, when in its normal position, as shown in Fig. 1, closes communication between the supply line and the secondary chamber 15 and opens communication between said chamber and the outlet end of the primary valve chamber 4 through the port 16. Also that when the valve is at the left end of its stroke, it closes said latter communication and opens communication between the secondary chamber 15 and the lubricant supply line 3 through the port 16. It is preferable to make the valve 5 of such length that it will close the communication between the primary chamber 4 and secondary chamber 15 after the valve has made a short movement to the left, and will then maintain such communication closed until the valve has moved some distance to the left, so that during such movement the valve will serve as a plunger operating in the valve chamber 4 as a cylinder and thereby inject a predetermined amount of lubricant ahead of it, and through the check valve 10, into the associated bearing.

In Fig. 3 A represents a hand-operated compressor containing a supply of lubricant and operable to force the lubricant under pressure from the compressor unit through one or more distributing or supply lines 3 to the separate control units embodying the invention, designated in this figure as B, and each unit B is connected to a respective bearing part C to be lubricated.

In the operation of the device, the compressor A is operated to force lubricant from the source of supply through the line 3 and against the rear side of the primary piston valve 5, forcing said valve to the left to close the communication between the secondary chamber 15 and the associated bearing, and opening the communication between the chamber 15 and the supply side of the passage. Such movement of the valve to the left causes the valve to act as a plunger to inject an initial predetermined quantity of lubricant at a high pressure into the bearing. When the port 16 is uncovered to the supply source, lubricant is forced into the secondary chamber 15 against the underside of the piston 17, causing such piston to move to the upper end of its stroke, which may be visibly determined by the position of the indicating stem 19 with respect to the cylinder. When the chamber 15 has thus been filled, the pumping of lubricant thereto is stopped and the pressure in the supply or compressor side of the line is then released, as is common and well understood in the art, thus permitting the valve 5 under the action of the spring 9, to return to its normal position, which closes the port 16 to the supply side of the line and opens it to the associated bearing. This return movement of the primary piston to its normal position in the line, causes a vacuum to be formed to the left of it, which vacuum is immediately supplied with lubricant from the secondary chamber as soon as the port 16 is uncovered to the left of the piston, and this action is the same whether the secondary chamber possesses a floating or a spring pressed piston. A second predetermined quantity of fluid is injected into the bearing by the spring pressed secondary piston at a substantially lower pressure, which pressure is regulated by the tension of the spring 18. This feeding pressure from the secondary chamber 15 is merely sufficient to supply lubricant to the associated bearing at what may be termed a normal working pressure and as the lubricant in the bearing becomes dissipated by use. The primary and secondary springs and piston areas are so proportioned that the primary piston returns to its normal position ahead of the secondary piston.

It is apparent that I have provided a simple and efficient control unit for centralized lubricating systems of the character described, which unit is operable, first to utilize a sufficiently high pressure in the supply end of the line to positively force a predetermined amount of lubricant into each bearing or part to be lubricated, regardless of whether the bearing is tight or loose or clogged with foreign matter, or otherwise; also to provide a positive means for storing the next charge plus a second predetermined amount of lubricant in a secondary chamber, said secondary charge being forced at a low working pressure to the associated bearing part after the return of the initial high pressure lubricant forcing means to its normal position.

In Fig. 7 I have shown a modification of my control unit in which the secondary chamber for the lubricant is provided with separate inlet and outlet ports, both controlled by the primary piston valve, so that the secondary chamber in this case may be considered as being disposed in and forming a part of the lubricant supply passage to the associated bearing part. In this form of the invention, the secondary supply chamber 25 has an inlet port 26 and an outlet port 27 between its bottom and the primary chamber or passage 28, and the primary piston valve 29, when in its normal position, closes the port 26 to the supply source and opens the port 27 to the bearing end of the unit. Upon an initial movement of the piston 29 under pressure in the supply line, it first moves to close the port 27 and then continues its movement to force a high pressure charge of lubricant to the bearing before the port 26 is uncovered to the supply side of the line.

In the form of control unit shown in Fig. 8, the supply of lubricant to and its discharge from the secondary chamber is controlled by other means than the piston valve or means which is employed to supply an initial high pressure charge of lubricant to the bearing. In this form, the primary piston 30 is mounted in the lubricant supply passage 31 and normally held in retracted position toward the pressure source by a spring 32. The chamber in which the piston 30 works is open at its forward end, through a passage 33, to the bearing to be supplied, so that upon a forward movement of the piston 30, lubricant in said passage is forced into the bearing. The secondary lubricant supply chamber 34 is in communication at its bottom through a port 35 with a by-pass 36, one end of which is in communication with the supply line 31 at the rear side of the piston 30, while its other end is in communication with the passage 33 at the forward side of said piston. A check-valve 37 is mounted in the inlet or supply line end of the by-pass 36 and adapted to open against the pressure of a spring 38 under pressure from the supply line 31. The outlet end of the by-pass 36 has a check-valve 39 therein, which has a double seat in the by-pass, one seat being designated 40, which is toward the secondary chamber 34 and against which the valve is held normally seated by a spring 41. The other seat, which is designated 42, is at the opposite side of the valve to the secondary chamber and the seating of the valve against this seat is such that a slow leakage of lubricant is permitted to take place past the valve and into the passage 33 from the secondary supply chamber 34. A secondary piston 43 is provided in the secondary supply chamber 34 and normally held at the lower end of its stroke by a spring 44.

The tension of the spring 38 should be less than the maximum pressure adapted to be generated in the supply line 31 and greater than the tension of the secondary piston spring 44 and the check-valve spring 41, and the latter should be less than the spring 44. For illustration, the compressor unit may be adapted to generate a pressure of 1000 lbs. in the supply line 31; the pressure of the check-valve spring 38 might then be 500 lbs., the pressure of the secondary piston spring 44, 100 lbs., and the pressure of the check-valve spring 41, 25 lbs. The pressure of the spring 32 is immaterial, so long as it is sufficient to return the primary piston 30 to its normal position, after pressure is relieved in the line 31.

In the operation of this form of control unit, a pressure created in the supply line 31 first operates to force the primary piston 30 forward to supply an initial high pressure charge of lubricant to the associated bearing, and when the pressure in the supply line has been raised sufficiently to overcome the tension of the valve spring 38, lubricant is then supplied through the by-pass 36 to the secondary chamber 34, the piston 43 raising against the tension of the spring 44 during such supply. When the supplying pressure has been relieved from the line 31, the check-valve 37 closes and the secondary piston 43 then operates to force lubricant through the discharge end of the by-pass around the check valve 39 and into the passage 33. During the movement of the primary piston 30 to supply an initial high pressure charge to the bearing, the check-valve 30 is forced against the seat 40, thereby preventing such charge from entering the secondary chamber. During the supply of lubricant to the secondary chamber, the check-valve 39 is moved against the seat 42, the leakage past the same permitting only a very small portion of the lubricant to enter the passage 33 during such charging action and causing the major portion of the lubricant to enter and fill the secondary supply chamber. Should the check-valve 39 remain seated against the seat 42 during the action of the secondary piston 43 to supply a low pressure charge of lubricant to the associated bearing, the leakage past the valve is sufficient to take care of such supply to the bearing. This leakage also permits the piston 43 to return to its normal position in the line when the line pressure is released.

If desired, the stem 19 attached to the secondary piston 17 may be employed as the movable element of an electric switch and upon a predetermined outward movement thereof from normal lowered position make contact with a pair of switch elements 50 disposed in an electric signal circuit 51, having a signal element 52 therein (Fig. 3) which, in the present instance, is shown as constituting an electric lamp. If the lubricating line is equipped with a plurality of control units B, each unit should have an electric switch 19—50 disposed in series in the signal circuit, so that the signal would not be operated if any one of the control units be inoperative to an extent that a secondary charge of lubricant would not be supplied to the secondary chamber of any unit.

In the present instance, the switch contacts 50 are shown as being mounted on a clip or cap member 53 that is releasably engaged with the outer end of the secondary cylinder 14 of an associated control unit.

In Figs. 5 and 6 a control unit is shown as being equipped at the outer end of its secondary supply cylinder with a disk 55 of paper or other easily perforable material, which is disposed in position to be perforated by an outward movement of the secondary piston stem 19. For this purpose, a cap member 56 is mounted on the outer end of the cylinder 14 and is provided with an opening 57 through which the stem 19 may be projected upon an outward movement thereof. The disk 55 may be held over the opening 57 by a spring clip 58 in position to be perforated or visibly marked by the outer end of the stem 19 upon an initial upward movement thereof. After the compressor has been operated to force a supply of lubricant to the various control units in the system, the operator can easily determine, by examining the various disks 55, which, if any, of the units is not properly functioning, for if he finds that a disk has not been perforated by the stem 19 of the unit, he will know that that unit is not properly working. It is apparent that the use of the discs 55 enables a recording of the action of the several units so that upon an inspection, after a charging operation, it can be determined if all units have properly functioned.

It is apparent from the foregoing that my invention broadly contemplates the provision of a control unit or control means in a lubricating system which is operable by pressure in the lubricant supply line, first to supply an initial high pressure charge of lubricant to an associated bearing, and then to supply a low pressure charge of lubricant to such bearing, such low pressure charge preferably constituting a measured quantity of lubricant which will continue to be supplied to the bearing part at low or working pressure until such supply is exhausted. The invention also contemplates not only the supplying of an initial high pressure charge and then a low pressure charge of lubricant to a bearing, but the supplying of the low pressure charge lubricant in a measured quantity to a secondary supply chamber between the periods of supplying of high pressure and low pressure charges to the bearing.

It is apparent that in each of the forms of control units illustrated, a secondary lubricant supply chamber is provided for supplying lubricant to the associated bearing part; that a primary piston member is employed which is operated by an initial pressure in the supply line to supply an initial high pressure charge of lubricant to the bearing after which a lubricant is supplied to the secondary chamber to be discharged therefrom to the bearing part when the high pressure charge means has performed its high pressure charging function, and that in two of the forms illustrated, the high pressure charge means serves also to control the supply of lubricant to and its discharge from the secondary supply chamber.

I wish it understood that my invention is not limited to any specific construction, arrangement or form of the parts, as it is capable of numerous modifications and changes without departing from the spirit of the claims.

What I claim as new and desire to secure by Letters Patent is:

1. In a lubricating line, means operable by pressure in the line to supply an initial high pressure charge to a part to be lubricated, and means automatically operable to subsequently supply a low pressure charge to such part.

2. In a lubricating line, means operable by pressure in the line to supply an initial high pressure charge of lubricant to a part to be lubricated and then to return to a normal position, and means automatically operable upon the return of said first means to normal position to supply a low pressure charge to such part.

3. In a lubricating line, means forming a secondary lubricant supply chamber to which lubricant is supplied from said line, means in the line operable by pressure therein to supply an initial high pressure charge to a part to be lubricated, and means in said chamber automatically operable to supply a low pressure charge to said part.

4. In a pressure feed lubricant supply line, a secondary lubricant supply chamber adapted to have communication with said line, means operable by pressure in the line to supply an initial high pressure charge to a part to be lubricated and also operable to regulate the communication of said secondary chamber with the line, and means associated with the secondary chamber operable to supply a low pressure charge of lubricant to said part when said high pressure charge means is in a predetermined position of its movement.

5. In a pressure feed lubricating line, a secondary lubricant supply chamber having communication with the line to receive its lubricant supply therefrom and having communication with the part to be lubricated, means operable by an initial lubricant supplying pressure in the line to supply an initial high pressure charge of lubricant to said part, and means associated with said secondary chamber and operable to supply a predetermined quantity of lubricant to said part at a lower pressure than said initial charge.

6. In a pressure feed lubricating line, means communicating with said line and with a bearing part to be lubricated to receive a lubricant supply from one and deliver it to the other, means normally disposed in one position relative to the line and operable by an initial lubricant feeding charge therein to supply an initial high pressure charge of lubricant to the bearing part, lubricant being supplied to said first means from said line by pressure therein and when said second means has moved a predetermined distance from normal position, and means operable to force a measured quantity of lubricant from said first means to the bearing part under low pressure and after said second means has returned to its normal position from an initial high pressure charging operation.

7. A control means for pressure feed lubricating systems having a passage with inlet and outlet openings and a secondary supply chamber in communication with said passage, and a valve in said passage normally disposed in position to open the communication between the outlet end of said passage and said secondary chamber and operable by supply line pressure to impart a line opening-up pressure through the outlet opening of said passage and to close said chamber communication to the outlet side and open it to the inlet side of the passage.

8. A control means for pressure feed lubricating systems having a passage with inlet port, outlet port and intermediate port for a lubricant, and means operable in said passage to normally close the communication between said inlet port and intermediate port and open communication between the latter and said outlet port and operable by pressure through the inlet port to impart an initial high pressure through the outlet port and close said intermediate port to the outlet port and open it to the inlet port.

9. A control of the class described, including means forming a valve chamber with inlet and outlet passages and a secondary chamber in communication with the valve chamber, and a valve in the valve chamber operable to control the communication between said secondary chamber and the inlet and outlet passages of the valve chamber and also operable by pressure at its inlet side to create an initial supply line pressure through the outlet passage of the valve chamber.

10. A control of the class described, including means forming a passage with a secondary supply chamber therein, said passage adapted to be connected at one end to a material pressure feed source and at its other end to a distributing line for the material, and a valve in said passage normally closing the communication between said chamber and a connected supply source and opening the communication between the chamber and connected distributing line and operable by pressure from the supply source to initially communicate such pressure to the distributing line and reverse the normal order of communication between said chamber and passage.

11. In a control of the class described, means forming a secondary supply chamber and inlet and outlet passages therefor, and means for controlling the communication between said secondary chamber and passages and operable by an initial material supply pressure through the inlet passage to create a line-freeing pressure in said outlet passage.

12. In a control of the class described, means forming a secondary supply chamber and inlet and outlet passages therefor, and means for controlling the communication between said secondary chamber and passages and operable by an initial material supply pressure through the inlet passage to create a line-freeing pressure in said outlet passage, said control means normally disposed in position to close the communication between said inlet passage and secondary chamber and to open the communication of said chamber with the outlet passage.

13. In a control of the class described, means forming a secondary supply chamber and inlet and outlet passages therefor, means for controlling the communication between said secondary chamber and passages and operable by an initial material supply pressure through the inlet passage to create a line-freeing pressure in said outlet passage, and means in the secondary chamber operable to force material from said chamber through said outlet passage when the communication therebetween is open.

14. In a control of the class described, means forming a secondary supply chamber, a valve chamber in communication with said secondary chamber and adapted to have inlet communication with a pressure feed material supply source and outlet communication with a material distributing line, a piston in the secondary cylinder, pressure means acting on the piston and yieldingly holding it at the inlet end of the chamber, a valve mounted in the valve chamber and normally disposed in position to close the communication between the secondary chamber and inlet passage and to open communication between such chamber and the outlet passage, said valve being movable by feed line pressure at the inlet passage side thereof to reverse the normal order of communication between said passages and the secondary chamber and to create a temporary line opening pressure at the outlet side of the valve chamber.

15. In a control of the class described, means forming a secondary supply chamber, a valve chamber in communication with said secondary chamber and adapted to have inlet communication with a pressure feed material supply source and outlet communication with a material distributing line, a piston in the secondary cylinder, pressure means acting on the piston and yieldingly holding it at the inner end of the chamber, a valve mounted in the valve chamber and normally disposed in position to close the communication between the secondary chamber and inlet passage and to open communication between such chamber and the outlet passage and movable by feed line pressure at the inlet passage side thereof to reverse the normal order of communication between said passages and the secondary chamber and to create a temporary line opening pressure at the outlet side of the valve chamber, and an outwardly opening check valve associated with said outlet passage.

16. In a control of the class described, a secondary material supply chamber adapted to have valve-controlled communication both with a pressure feed material supply source and with a material distributing line, a piston in said chamber movable in one direction by material forced into the chamber from the supply source, an element movable by the piston, and a recording member adapted to be engaged and permanently marked by a predetermined movement of said element with the piston.

17. In a control of the class described, a secondary material supply chamber adapted to have valve-controlled communication both with a pressure feed material supply source and with a material distributing line, a piston in said chamber movable in one direction by material forced into the chamber from the supply source, an element movable by the piston, and means for holding a recording member in position to be engaged and permanently marked by said element when moved a predetermined extent.

18. In a lubricating line, means operable by pressure in the line to supply a predetermined high pressure charge to a part to be lubricated, and means automatically operable to subsequently supply a predetermined low pressure charge to such part.

19. In a lubricating line, a measuring valve of the piston displacement type, operable by pressure in the line to supply a predetermined high pressure charge to a part to be lubricated, and means automatically operable to subsequently supply a predetermined low pressure charge to such part.

20. In a control of the class described, a cylinder forming a material supply chamber adapted to have valve-controlled communication both with a pressure feed material supply source and with a material distributing line, a piston in said chamber movable in one direction by material forced into the chamber from the supply source, means acting on the piston to normally move it in the opposite direction, a stem projecting from the piston without the cylinder, and means for holding a recording disc without the cylinder in position to be perforated by said stem when the piston has moved a predetermined extent under material feeding pressure.

21. In a control of the class described, a material supply chamber adapted to have valve-controlled communication both with a pressure feed material supply source and with a material distributing line, a piston in said chamber movable in one direction by material forced into the chamber from the supply source, a removable record means, and an element movable by the piston and operable to act on said record means to effect a permanent record thereon when the piston has moved a predetermined extent.

22. In a lubricating line, means operable by pressure in the line to supply an initial high pressure charge to a part to be lubricated, and means automatically operable to subsequently supply a predetermined measured low pressure charge to said part.

23. In a lubricating line, means operable by pressure in the line to supply an initial high pressure charge of lubricant to a part to be lubricated and then to return to a normal position, and means automatically operable upon the return of said first means to normal position to supply a predetermined measured low pressure charge to such part.

24. In a lubricating line, means forming a secondary lubricant supply chamber to which lubricant is supplied from said line, means in the line operable by pressure therein to supply an initial high pressure charge to a part to be lubricated, and means in said chamber automatically operable to supply a predetermined low pressure charge to said part.

THEODORE W. HALLERBERG.